US009418112B1

(12) United States Patent  
Farah (10) Patent No.: US 9,418,112 B1  
(45) Date of Patent: Aug. 16, 2016

(54) SYSTEM AND METHOD FOR ALTERNATE KEY DETECTION

(75) Inventor: Christopher C. Farah, Orono, ME (US)

(73) Assignee: Christopher C. Farah, Springfield, VA (US)

( * ) Notice: Subject to any disclaimer, the term of this patent is extended or adjusted under 35 U.S.C. 154(b) by 1697 days.

(21) Appl. No.: 12/460,758

(22) Filed: Jul. 24, 2009

(51) Int. Cl.  
    *G06F 17/30* (2006.01)
(52) U.S. Cl.  
    CPC ............... *G06F 17/30516* (2013.01)
(58) Field of Classification Search  
    CPC combination set(s) only.  
    See application file for complete search history.

(56) References Cited

U.S. PATENT DOCUMENTS

| | | | |
|---|---|---|---|
| 2004/0181526 A1* | 9/2004 | Burdick et al. | 707/6 |
| 2006/0064017 A1* | 3/2006 | Krishnan et al. | 600/450 |
| 2010/0005048 A1* | 1/2010 | Bodapati et al. | 706/47 |

OTHER PUBLICATIONS

Holly L. Howe, et al., "Method to Assess Identifiability in Electronic Data Files", American Journal of Epidemiology, 2007, 165(5): pp. 597-601, Johns Hopkins, USA.

* cited by examiner

*Primary Examiner* — Shyue Jiunn Hwa  
(74) *Attorney, Agent, or Firm* — Kuta Intellectual Property Law, LLC; Christine M. Kuta (57) ABSTRACT

The system and method of analyzing record uniqueness allows for the optimized delivery of patient data to researchers while maintaining the requirements of HIPAA regulations and other privacy policies. The system and method analyze the data set for redundant data and then tests the data for uniqueness from single factors through a defined multiple of factors. The system further enables a threshold of uniqueness to be set enabling additional privacy protection by identifying records that are nearly unique.

14 Claims, 6 Drawing Sheets

| No. | Acsn Num-Pt | Age At Dx | Clin Stg | Path Stg | ICDO3 Histo-Desc | Class | Site |
|---|---|---|---|---|---|---|---|
| 1 | ABCDE | 082 | 1 | 1 | DUCT & LOBULAR CARCINOMA | 2 | C504 |
| 2 | ABCDF | 072 | 2A | 99 | DUCT CARCINOMA | 1 | C508 |
| 3 | ABCDF | 073 | 99 | 2B | LOBULAR CARCINOMA | 1 | C504 |
| 4 | ABCDG | 077 | 99 | 4 | DUCT CARCINOMA | 1 | C508 |
| 5 | ABCDJ | 068 | 99 | 1 | DUCT CARCINOMA | 1 | C504 |
| 6 | ABCDL | 087 | 99 | 3C | LOBULAR CARCINOMA | 2 | C501 |
| 7 | ABCDN | 059 | 99 | 1 | LOBULAR CARCINOMA | 1 | C503 |
| 8 | ABCDQ | 058 | 99 | 2B | DUCT & LOBULAR CARCINOMA | 1 | C504 |
| 9 | ABCDT | 061 | 1 | 99 | DUCT & LOBULAR CARCINOMA | 2 | C503 |
| 10 | ABCDZ | 083 | 99 | 1 | DUCT CARCINOMA | 1 | C502 |
| 11 | ABCEA | 068 | 0 | 99 | SOLID CARCINOMA | 2 | C508 |
| 12 | ABCED | 052 | 99 | 1 | TUBULAR ADENO-CARCINOMA/ADENOMA | 1 | C504 |
| 13 | ABCEL | 079 | 1 | 1 | DUCT MIXED W/ OTHER TYPES CARCINOMA | 1 | C504 |
| 14 | ABDAA | 084 | 99 | 2A | DUCT CARCINOMA | 1 | C501 |
| 15 | ABDAA | 086 | 1 | 99 | DUCT CARCINOMA | 1 | C508 |
| 16 | ABEAM | 076 | 4 | 99 | ADENOCARCINOMA/ADENOMA | 2 | C509 |
| 17 | ABEAP | 094 | 99 | 1 | LOBULAR CARCINOMA | 1 | C504 |
| 18 | ABEBD | 080 | 0 | 99 | SOLID CARCINOMA | 1 | C501 |
| 19 | ABEDD | 053 | 88 | 88 | LOBULAR CARCINOMA | 1 | C504 |
| 20 | ABGDA | 067 | 99 | 1 | DUCT CARCINOMA | 2 | C504 |
| 21 | ABMFJ | 034 | 99 | 2B | DUCT CARCINOMA | 2 | C504 |
| 22 | ACEJD | 077 | 99 | 2B | DUCT CARCINOMA | 1 | C508 |
| 23 | BAAAA | 048 | 99 | 1 | DUCT CARCINOMA | 1 | C508 |
| 24 | BAAAA | 049 | 99 | 1 | INTRADUCTAL MICRO-PAPILLARY CARCINOMA | 1 | C502 |
| 25 | ABCED | 052 | 99 | 1 | TUBULAR ADENO-CARCINOMA/ADENOMA | 1 | C504 |
| 26 | BAAAA | 049 | 99 | 1 | INTRADUCTAL MICRO-PAPILLARY CARCINOMA | 1 | C502 |

| No. | Acsn Num-Pt | Age At Dx | Clin Stg | Path Stg | ICDO3 Histo-Desc | Class | Site |
|---|---|---|---|---|---|---|---|
| 1 | ABCDE | 082 | 1 | 1 | DUCT & LOBULAR CARCINOMA | 2 | C504 |
| 2 | ABCDF | 072 | 2A | 99 | DUCT CARCINOMA | 1 | C508 |
| 3 | ABCDF | 073 | 99 | 2B | LOBULAR CARCINOMA | 1 | C504 |
| 4 | ABCDG | 077 | 99 | 4 | DUCT CARCINOMA | 1 | C508 |
| 5 | ABCDJ | 068 | 99 | 1 | DUCT CARCINOMA | 1 | C504 |
| 6 | ABCDL | 087 | 99 | 3C | LOBULAR CARCINOMA | 2 | C501 |
| 7 | ABCDN | 059 | 99 | 1 | LOBULAR CARCINOMA | 1 | C503 |
| 8 | ABCDQ | 058 | 99 | 2B | DUCT & LOBULAR CARCINOMA | 1 | C504 |
| 9 | ABCDT | 061 | 1 | 99 | DUCT & LOBULAR CARCINOMA | 2 | C503 |
| 10 | ABCDZ | 083 | 99 | 1 | DUCT CARCINOMA | 1 | C502 |
| 11 | ABCEA | 068 | 0 | 99 | SOLID CARCINOMA | 2 | C508 |
| 12 | ABCED | 052 | 99 | 1 | TUBULAR ADENO-CARCINOMA/ADENOMA | 1 | C504 |
| 13 | ABCEL | 079 | 1 | 1 | DUCT MIXED W/ OTHER TYPES CARCINOMA | 1 | C504 |
| 14 | ABDAA | 084 | 99 | 2A | DUCT CARCINOMA | 1 | C501 |
| 15 | ABDAA | 086 | 1 | 99 | DUCT CARCINOMA | 1 | C508 |
| 16 | ABEAM | 076 | 4 | 99 | ADENOCARCINOMA/ADENOMA | 2 | C509 |
| 17 | ABEAP | 094 | 99 | 1 | LOBULAR CARCINOMA | 1 | C504 |
| 18 | ABEBD | 080 | 0 | 99 | SOLID CARCINOMA | 1 | C501 |
| 19 | ABEDD | 053 | 88 | 88 | LOBULAR CARCINOMA | 1 | C504 |
| 20 | ABGDA | 067 | 99 | 1 | DUCT CARCINOMA | 2 | C504 |
| 21 | ABMFJ | 034 | 99 | 2B | DUCT CARCINOMA | 2 | C504 |
| 22 | ACEJD | 077 | 99 | 2B | DUCT CARCINOMA | 1 | C508 |
| 23 | BAAAA | 048 | 99 | 1 | DUCT CARCINOMA | 1 | C508 |
| 24 | BAAAA | 049 | 99 | 1 | INTRADUCTAL MICRO-PAPILLARY CARCINOMA | 1 | C502 |
| 25 | ABCED | 052 | 99 | 1 | TUBULAR ADENO-CARCINOMA/ADENOMA | 1 | C504 |
| 26 | BAAAA | 049 | 99 | 1 | INTRADUCTAL MICRO-PAPILLARY CARCINOMA | 1 | C502 |

SYSTEM AND METHOD FOR ALTERNATE KEY DETECTION

BACKGROUND

The Health Insurance Portability and Accountability Act (HIPAA), enacted in 1996 includes provisions intended to help people maintain privacy with regard to their health information. Title II of HIPAA, known as the "Administrative Simplification" (AS) provisions, includes a privacy rule that addresses the security and privacy of health data. The Privacy Rule, which took full effect in 2004, regulates the use and disclosure of Protected Health Information (PHI) held by covered entities such as health insurers and medical service providers. PHI is defined as any information held by a covered entity which concerns health status, provision of health care or payment for health care that can be linked to an individual person.

Classic identifiers include identifying information such as name, patient number, and Social Security number. In general, a classic identifier is any information that is meant to identify the person as an individual. One of the conventional methods used to protect a patient's privacy includes hiding classic identifiers such as name, Social Security number (SSN), medical record number (MRN), and patient identification number. It is possible, however, to identify a person based on a non-classic identifier or by using a combination of non-classic identifiers. That is, in some cases, a field or a combination of fields may be identifying. This may be a problem in those systems that combine clinical, geographic and demographic data, e.g. cancer site, county and race may be identifying, particularly in regions of low population density.

A conventional method for assessing the risk of potential breach of patient confidentiality via non-classic identifiers in a set of data records is the "Record Uniqueness" method. The Record Uniqueness method is disclosed in "Method to Assess Identifiability in Electronic Data Files" by Holly L. Howe, et al., American Journal of Epidemiology, December 2006. The Record Uniqueness method generates frequencies for every variable and combination of variables in a data set. For each frequency distribution, the Record Uniqueness method counts the number of records with a frequency of one, which is defined as a unique record, and the number of records with a frequency of five or less, which is defined as a unique record set.

The Record Uniqueness method, however, does not take classic identifiers into account. Thus, a non-classic identifier may be overlooked as a result of data redundancy, when in fact, the redundancy is an attribute of the data record and not the non-classic identifier. Accordingly, assessing the risk of breach of confidentiality without classic identifiers can compromise patient confidentiality and can also compromise the integrity of the dataset.

For the foregoing reasons, there is a need for a more trustworthy method to analyze data records for personal identifiability.

SUMMARY

The present invention is directed to a system and method for analyzing datasets with classic identifiers, to identify single non-classic identifying elements and combinations of non-classic identifying elements in order to protect personal privacy. In the context of the present disclosure, there are three user tiers: record holders, researchers, and the general public. Record holders administer patient records associated with a particular healthcare database. Researchers analyze a subset of patient records to discover trends in health. The general public can review outcomes published by researchers in science journals. A record holder is authorized to access any PHI within a healthcare database so long as it is pertinent to his or her job. A HIPAA-trained researcher is authorized to analyze the minimum PHI associated with a healthcare database required to answer a scientific inquiry, so long as the corresponding research protocol has been approved by the record holder. The general public has no access to PHI.

Since the minimum amount of PHI required to assist a scientific inquiry is not well-defined, record holders generally err on the side of caution by reducing the data's resolution prior to releasing it to researchers. While this ensures compliance with HIPAA and local PHI regulations, it also often significantly reduces the data's value to researchers. Embodiments of the present invention provide advantages in reducing ambiguity associated with the release of data to researchers, thereby potentially increasing the amount of available data to researchers. Embodiments of the present invention benefit researchers in disclosure of investigative results in that results of a scientific inquiry may be made available to the general public with reduced concern of breaching patient privacy. Record holders are similarly benefited in that optimal support of scientific inquiry is possible in balance with protection of the data in the record holder's database.

Embodiments of the present invention include a system and method to analyze a dataset for identifying attributes creates a first subset of identifiers including classic identifiers and a second subset of data elements that are non-classic identifiers. Redundant records are removed. The second subset is tested for uniqueness from singletons, single data elements, through a defined number of combinations of data elements. The system further includes a threshold of uniqueness where the threshold can be set to a value greater than one. Accordingly, the system and method of the present invention can accommodate the requirements of regulations and other privacy policies while meeting the needs of providing valid data for research.

In one embodiment, the method for assessing identifiability in a set of data records in a computer wherein the data records include a plurality of elements having at least one classic identifier includes the step of receiving the set of data records. The computer is provided with classic identifiers and forms a first subset of elements that are classic identifiers and a second subset of elements that are not classic identifiers. In the second subset, the computer tests combinations of elements for record uniqueness and generates as output non-classic identifiers and combinations of non-classic identifiers. In this way, data records having identifiability through non-classic identifiers are discovered.

In a first alternative embodiment, the computer tests singletons for uniqueness. In this way, a complete set of non-classic identifiers is discovered. In a second alternative embodiment, the computer identifies and removes redundant records. Data sets having redundant records can result in a flawed redacted dataset that shows a plurality of instances of combinations of elements where for example only one instance exists. This can also result in a failure to accurately uncover non-classic identifiers. In a further alternative embodiment, the computer has a threshold of uniqueness that enables it to assess those records having instances between one and the threshold of uniqueness as identifiable. In a still further embodiment, the computer has a testing threshold that enables it to test combinations of elements up to the testing threshold for uniqueness. This can increase the efficiency of review of data records by limiting the number of elements in a tested combination.

In another embodiment, the system that assesses the identifiability of a set of data records includes a library to store classic identifiers. The system further includes a set generator configured to receive the set of data records and to form, from the set of data records, a first subset of elements that are classic identifiers and a second subset of elements that are not classic identifiers. The system further includes a uniqueness generator configured to test combinations of elements of the second subset for uniqueness. The system assesses a set of data records for the identifiability of non-classic identifiers both singly and in combination, by comparing their level of uniqueness to a classic identifier.

In an alternative arrangement, the system further includes a redundancy tester configured to test the set of data records for redundant data records. In a second alternative arrangement, the uniqueness generator has a threshold of uniqueness such that the uniqueness generator identifies those combinations having instances up to the threshold of uniqueness as being unique. In a third alternative arrangement, the uniqueness generator further includes a testing threshold such that combinations of elements from one to the threshold are tested.

The present invention together with the above and other advantages may best be understood from the following detailed description of the embodiments of the invention illustrated in the drawings, wherein:

DESCRIPTION

Embodiments of the present invention identify and track fields or combinations of fields in repositories of information that may jeopardize patient privacy. Embodiments of the invention offer data repositories and record holders heightened awareness of potential identifiers, thereby reducing ambiguity when releasing data to an investigator. Further, embodiments of the present invention filter datasets such that published data is largely not identifying, even when coupled with available census, or other demographic data. For example, given a requested patient set, the systems and methods according to the present invention determine that a combination of data elements (for example, age, gender, and cancer site) is a unique key and automatically prompts the system user. This combination can then be reviewed, for example, by a Data Utilization Committee. The combination can then be accepted or rejected as a valid key, before proceeding with an investigator's request for patient data.

In the following description, for the purposes of explanation, numerous specific details are set forth in order to provide a thorough understanding of the present invention. One skilled in the art will understand that the present invention may be practiced without some of these specific details. In addition, the following description provides examples, and the accompanying drawings show various examples for the purposes of illustration. These examples, however, should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

Portions of the following detailed description may be presented in terms of certain processes and symbolic representations of operations on data bits. These process descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

These and similar terms are to be associated with the appropriate physical quantities and are merely convenient labels applied to these quantities. Unless specifically stated otherwise, it is understood that discussions utilizing terms such as "processing" or "computing" or "calculating" or "determining" or "displaying" or the like, refer to the action and processes of a computer system, or similar device, that manipulates and transforms data represented as physical (electronic) quantities within the computer system's devices into other data similarly represented as physical quantities within the computer system devices such as memories, registers or other such information storage, transmission, display devices, or the like.

One of skill in the art will understand that the present invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. Structures for a variety of these systems will appear from the description below.

It is to be understood that various terms and techniques are used by those skilled in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

In one embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by a combination of programmed computer components and custom hardware components.

In one embodiment, the present invention may be provided as a computer program product which may include a machine or computer-readable medium, or a computer-usable medium, having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROM), and magneto-optical disks, Read-Only Memory (ROM), Random Access Memory (RAM), Erasable Programmable Read-Only Memory (EPROM), Electrically Erasable Programmable Read-Only Memory (EEPROM), magnetic or optical cards, flash memory, hard drive or the like.

Accordingly, the computer-readable medium includes any type of media/machine-readable medium suitable for storing electronic instructions. Moreover, embodiments of the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

Figure 1:
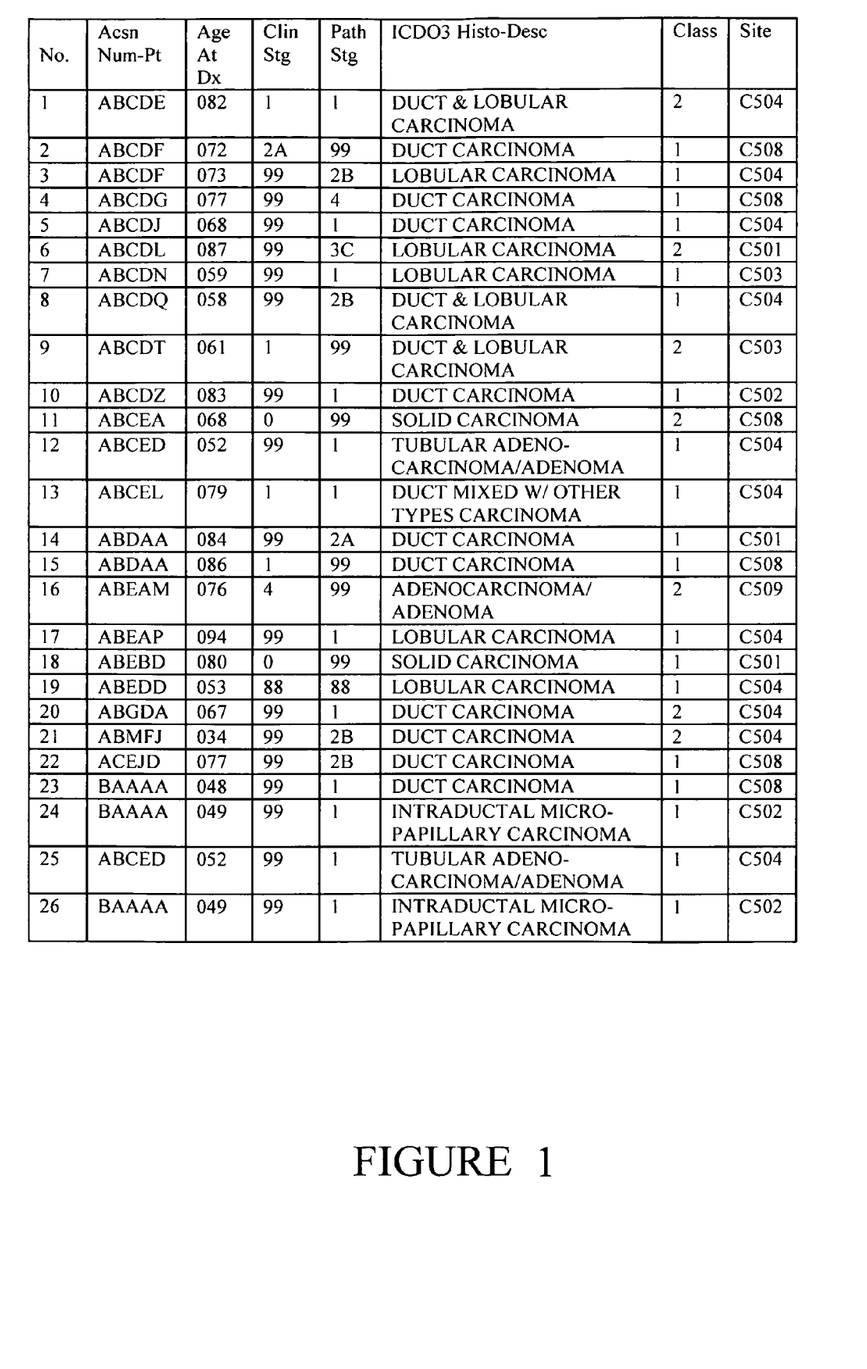
FIG. 1 is a table showing an example dataset suitable for use by embodiments of the present invention.

FIG. 1 is an example dataset of the type suitable for use by embodiments of the present invention. An application of the present invention is to ensure that PHI is not compromised while performing clinical research. The dataset in FIG. 1 is a collection of patient records.

The dataset is presented as a table having a plurality of rows and columns. Each row represents a data record and each column an element with the exception of the leftmost column. The leftmost column provides record numbers which are provided for the sake of clarity in this description. The elements in the columns are Accession number of the patient, Age at diagnosis, Clinical stage, Pathological stage, Histology Description, Class and Site (of cancer). Of these elements, the first, Accession number of the patient, is an established identifier and a classic identifier. As described above, a classic identifier is a piece of data associated with a person meant to identify that person such as a name or patient number. An established identifier is a piece of data determined to be identifying such as a classic identifier. The remaining elements are characteristics of the patient, generally grouped according to a particular health problem such as cancer type.

As it is possible for a single patient to have more than one condition, such as more than one type of cancer, a single patient can have more than one data record in the set as shown by record number 23 and record number 24. Also, as data in a set is often drawn from a number of sources, redundant records can be common. In this example, record number 25 is the same as record number 12 and record number 26 is the same as record number 24.

The elimination of the Accession number from the dataset removes the classic identifier from the records, however, the problem of identifying a particular patient from one of the other elements or combination of other elements remains. For example, there is a single instance of a person with a diagnosis age of 34 and a diagnosis of ductal carcinoma (record 21). The patient of record 21 is therefore potentially identifiable even without the Accession number.

Data sets used in research are generally far larger than the example provided here. While the embodiments described here operate in the areas of health care and health research, the present invention is not limited to those areas. The present invention is applicable in other situations in which personal identifiers are to be removed for privacy reasons. These other situations include market research and economic research.

Figure 2:
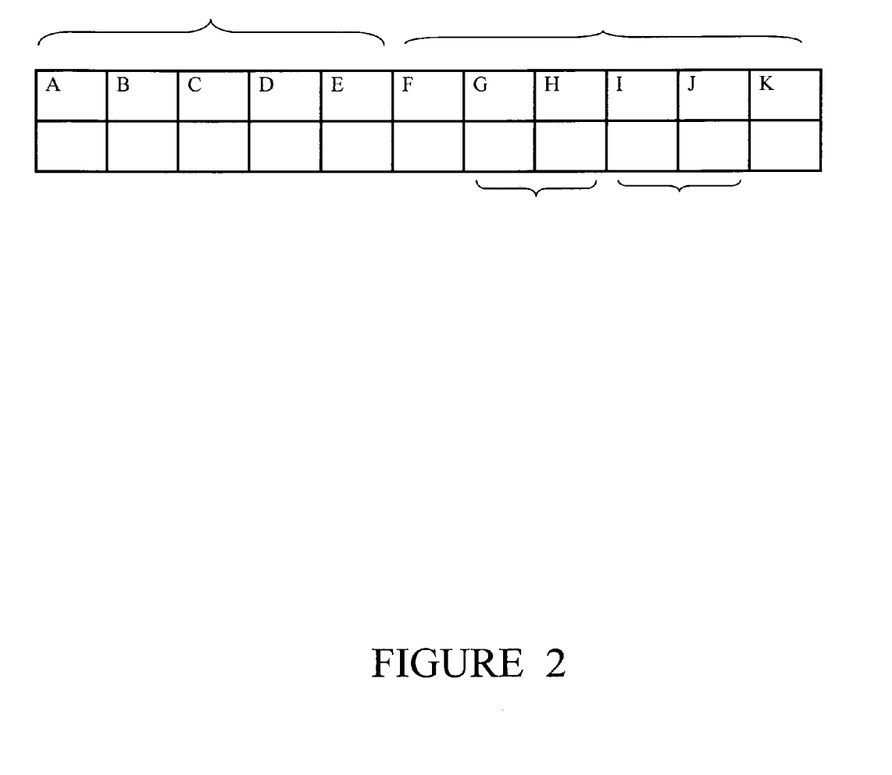
FIG. 2 is a simplified data table representative of a format of a dataset suitable for use by embodiments of the invention.

FIG. 2 is a simplified data table representative of a format of a dataset suitable for use by embodiments of the invention. The simplified data table is provided to show that data sets can contain a complex variety of identifying data and potentially identifying data. This example has several established identifiers, also referred to as known keys. Embodiments of the present invention take a set of patient data having a set of known keys, such as {A,B,C, (D,E)} and requested data {E, F, G, H, I, J, K} and determines alternative keys, for example {K, (G,H), (E,I,J)}. The method of determining alternate keys is described below with regard to FIG. 3.

Figure 3:
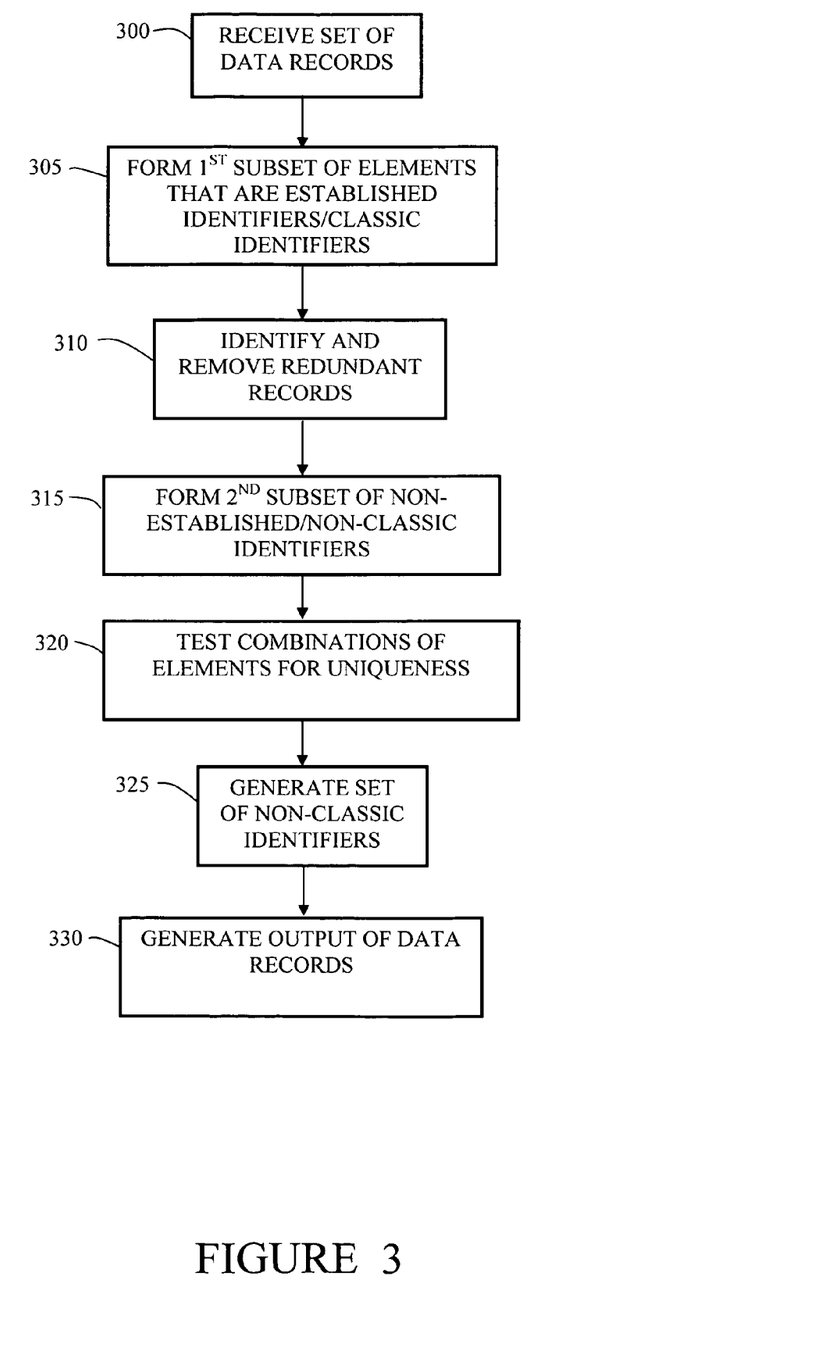
FIG. 3 is a flow chart of the operation of an embodiment of the alternate key detection system.

FIG. 3 is a flow chart of the operation of an embodiment of an alternate key detection method. The method operates, for example, in a programmed computer system. Other systems that execute the method are described below with respect to FIGS. 4 and 5.

At step 300, the system receives a set of data records such as that shown in FIG. 1. The data set has one established identifier, also referred to as a classic identifier, which is the Accession number of the patient. The data set has a number of elements of research data which are all non-classic identifiers. These elements are as follows: age at diagnosis, clinical stage, pathology stage, histology description, class and site.

At step 305, the system forms a first subset of elements that are classic identifiers. In the example data set, the first subset includes only one element, the Accession number of the patient.

At step 310, the system identifies and removes redundant records. One method of identifying redundant records is to perform a search for identical classic identifier values in the data set and then to compare the associated records. The present invention is not limited to this method of identifying redundant records. Those skilled in the art will recognize that other types of search and elimination methods for redundant records are possible within the scope of the invention. When identical records are found, all but one are removed from the data set. In the example data set, records 12 and 25 and 24 and 26 are redundant. So, for example, records 25 and 26 are removed from the data set at this step.

Since data sets actually used in research are generally large and often taken from more than one source, redundant records are not unusual. If redundant records are not removed, however, the result may be compromised research data. In the present example, failure to remove a redundant record results in a doubled incidence of one form of cancer. Further, failure to remove redundant records can also result in missed potential identifiers as will be understood from the description below.

At step 315, the system forms a second subset of elements that are not established identifiers. In this case, all of the non-classic identifiers are also not established identifiers. Therefore the second subset of elements includes: age at diagnosis, clinical stage, pathology stage, histology description, class and site.

At step 320, the system tests the second subset for record uniqueness. This is an iterative process. The system searches for a unique element or combination of elements in the second subset. That is, where the second subset has n elements, for k=1 to n, the system tests combinations of k elements for a uniqueness in the second subset. This portion of the method is explained in greater detail with regard to FIG. 4 below. In step 320, the non-classic identifiers in the data set are discovered.

At step 325, the system generates the set of non-classic identifiers discovered in step 320. The system in an alternative embodiment includes a uniqueness threshold U. The uniqueness threshold is an integer greater to or equal to one. The uniqueness threshold U is the number of instances of a combination of data elements (non-classic identifiers) in the dataset that triggers an assessment of "unique". Where the threshold is U and the total of non-redundant records in the dataset is r, where 1<U<r, a combination of k data elements would pass the uniqueness test and be assessed as identifying if the combination failed no more than U of r instances. In other words, a threshold of one results in assessments of unique for only those non-classic identifiers (or combinations of non-classic identifiers) with values (or combination of values) that appear once in the dataset. A threshold, for example, of six, results in assessments of unique for all those non-classic identifiers (or combinations of non-classic identifiers) with values (or combinations of values) that appear up to six times in the dataset. The threshold of uniqueness takes into account those types or combinations of identifiers that, while not absolutely unique, could compromise a patient's privacy. In the alternative embodiment, the system generates a set of non-classic, or established, identifiers determined in step 325 to be comparable to any of the classic identifiers, relative to threshold U.

At this stage, the data-holding institution can optionally review or have the established identifiers reviewed. The reviewer or review committee reviews the established identifier typically for the purposes of maximizing the data available for research without compromising patient privacy.

At step 330, the system generates an output of data records filtered according to the set of established identifiers. This output, having been examined by the system for potentially identifiable information, may then be released to researchers.

Figure 4:
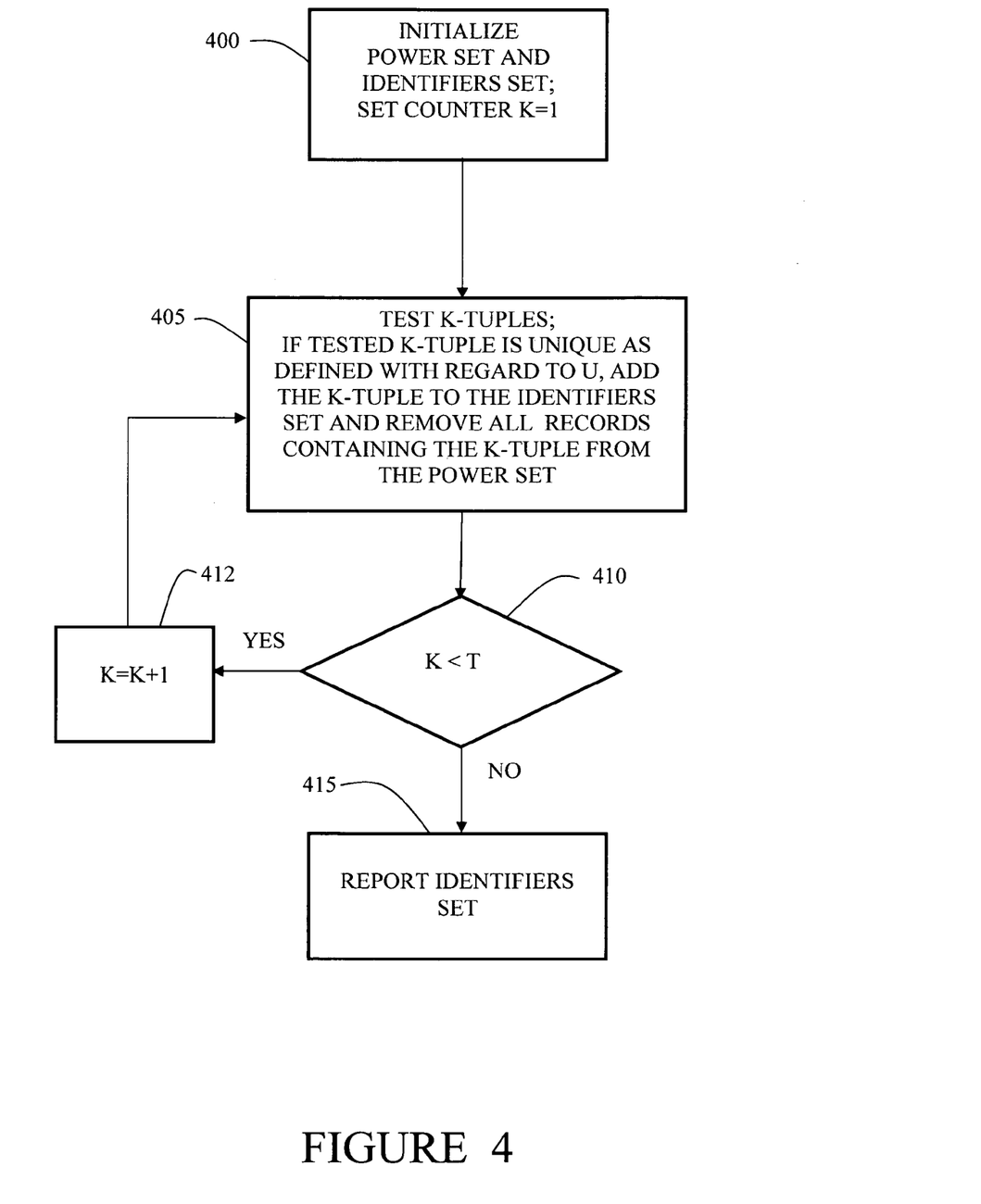
FIG. 4 is a flow chart of the uniqueness testing method according to principles of the invention.

FIG. 4 is a flow chart providing an embodiment of testing combinations of elements for uniqueness in the data set, step 320 of FIG. 3. In this embodiment, the system has a threshold T which is a combinations threshold whose value is defined by the system's users and a threshold U which is a uniqueness threshold whose value is defined by the system's users.

At step 400, the system initializes a power set which is defined as a set of possible combinations of data elements where the number of elements in the combination is less than or equal to the combination threshold T; an identifiers set which is defined as a set of non-classic identifiers and is initialized as an empty set, and a counter, K, is set to 1, At step 405, the system tests K-tuple combinations from the power set in step 400. Typically, the K-tuple combinations are tested in size and placement order; however the present embodiment is not limited to that order. If any K-tuple is uniquely identifying relative to U, it is placed in the identifiers set, and all elements of the power set containing this K-tuple are removed.

At step 410, if K<T, the system increments the counter K by 1 and returns to step 405. If K=T, the system proceeds to step 415.

At step 415, the identifiers set is reported.

Figure 5:
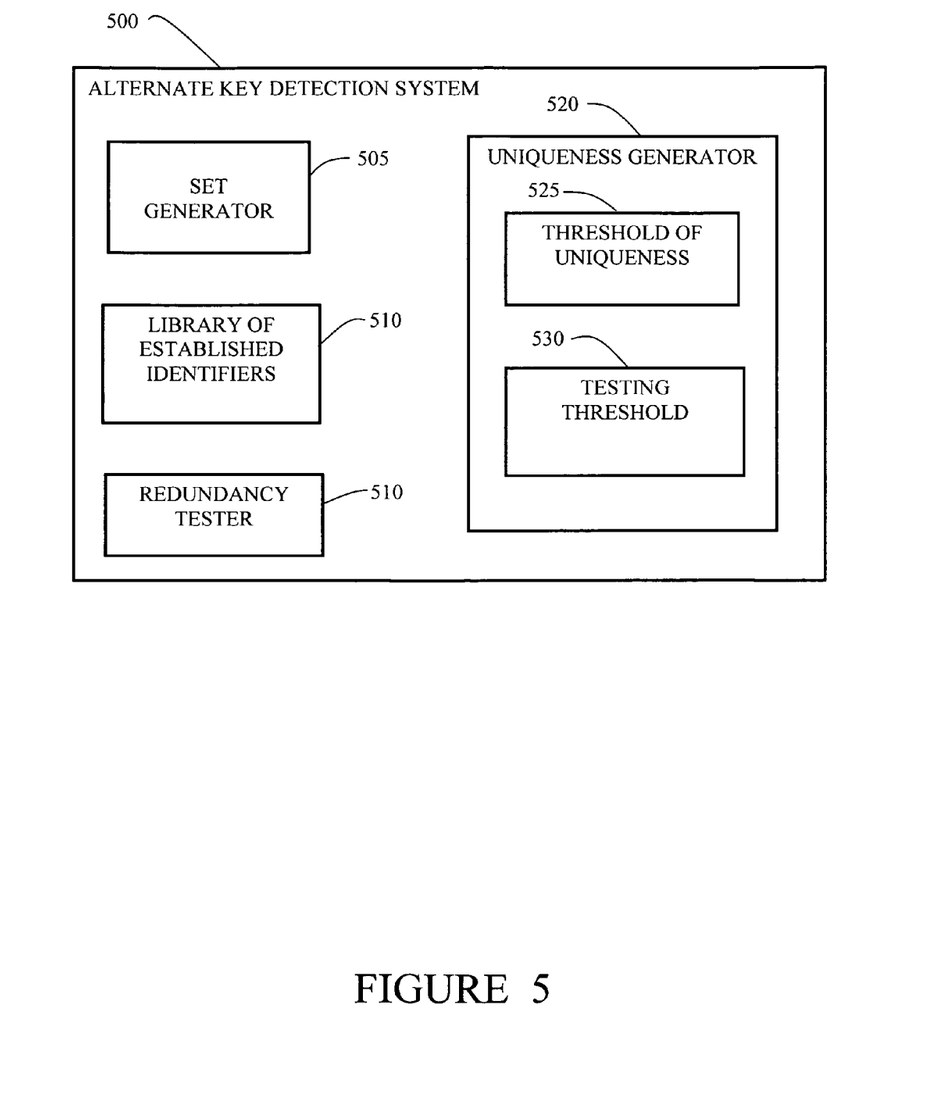
FIG. 5 is a block diagram of a first embodiment of the alternate key detection system according to principles of the invention.

FIG. 5 is a block diagram of a first embodiment of an alternate key detection system 500 according to principles of the invention. The system 500 includes a set generator 505, a library of established identifiers 510, a redundancy tester 515, and a uniqueness generator 520. The uniqueness generator 520 further includes a threshold of uniqueness 525 and a testing threshold 530. The system 500 can be operated in a single computer or in a distributed computing system. The system 500 could also be operated in a networked computing system. In a further alternative embodiment, the system 500 is programmed as a series of commands on a computer-usable medium. The library of established identifiers stores classic identifiers and other established identifiers that are found in patient health records, for example.

In operation, the system 500 takes as input the data set as described above with regard to FIGS. 1 and 2. The set generator 505 takes the data set as input and creates a first subset of elements of established identifiers according to the listing of established identifiers in the library 510. The set generator 505 also creates a second subset of non-established identifier elements. The redundancy tester 515 locates and eliminates redundant records in the data set. The uniqueness generator 520 then examines the data set, as described above with regard to FIGS. 3 and 4, for elements or combinations of elements that are unique and therefore assessable as identifying. The uniqueness generator 520 further includes a threshold of uniqueness 525 where the uniqueness generator 520 assesses elements or combinations of elements as identifying if they appear in the data set a number of times fewer than or equal to the threshold of uniqueness 525. The uniqueness generator 520 further includes a testing threshold 530 that provides a limit on the number of elements in a combination to be tested. In a large data set with many non-established identifiers, it can be inefficient to examine the larger combinations. In some cases, it can be assumed that the larger combination having a large number of elements are identifying. The testing threshold 530 increases the efficiency of the system 500 by limiting the combinations to be tested.

Figure 6:
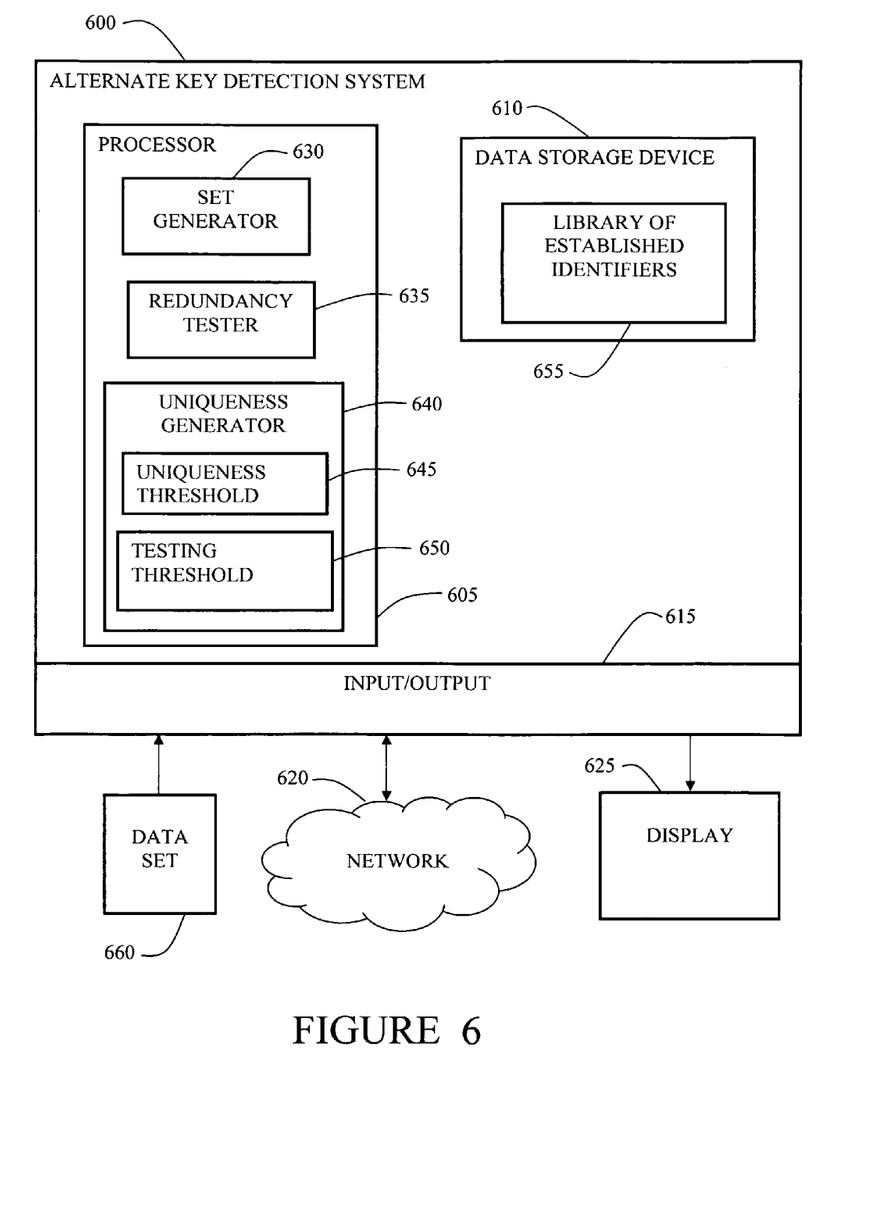
FIG. 6 is a block diagram of a second embodiment of the alternate key detection system according to principles of the invention.

FIG. 6 is a block diagram of a second embodiment of the alternate key detection system. The system 600 is implemented in a computer having a processor 605 and a data storage device 610, and an input/output interface 615. The input/output interface 615 is capable of communicating with a network 620 such as a local area network, wide area network or the Internet. The input/output interface 615 is also capable of communicating with a display device 625.

The processor 605 has a set generator 630, redundancy tester 635 and a uniqueness generator 640. The uniqueness generator 640 includes a uniqueness threshold 645 and a testing threshold 650. The data storage device 610 includes a library of established identifiers 655. The library of established identifiers 655 stores listings of classic identifiers and other data assessed as identifying.

In operation, the system 600 takes as input the data set 660 as described above with regard to FIGS. 1 and 2. The set generator 630 takes the data set as input and creates a first subset of elements of established identifiers according to the listing of established identifiers in the library 655. The set generator 630 also creates a second subset of non-established identifier elements. The redundancy tester 635 locates and eliminates redundant records in the data set. The uniqueness generator 640 then examines the data set, as described above with regard to FIGS. 3 and 4, for elements or combinations of elements that are unique and therefore assessable as identifying. The uniqueness generator 640 further includes a threshold of uniqueness 645 where the uniqueness generator 640 assesses elements or combinations of elements as identifying if they appear in the data set a number of times fewer than or equal to the threshold of uniqueness 645. The uniqueness generator 640 further includes a testing threshold 650 that provides a limit on the number of elements in a combination to be tested. In a large data set with many non-established identifiers, it can be inefficient to examine the larger combinations. In some cases, it can be assumed that the larger combination having a large number of elements are identifying. The testing threshold 650 increases the efficiency of the system 500 by limiting the combinations to be tested.

The present invention has been described with regard to health data applications; however, one skilled in the art will understand that embodiments of the invention may be applied to other types of data records such as marketing and healthcare data.

It is to be understood that the above-identified embodiments are simply illustrative of the principles of the invention. Various and other modifications and changes may be made by those skilled in the art which will embody the principles of the invention and fall within the spirit and scope thereof.

I claim:

1. A method for assessing identifiability in a set of data records, the method to operate in a computer, the data records including a plurality of elements wherein at least one element is a classic identifier, the method comprising:
   receiving at the computer the set of data records;
   forming a first subset of elements that are classic identifiers;
   forming a second subset of elements that are not classic identifiers;
   identifying and removing redundant records in the set of data records;
   in the second subset, testing combinations of elements for record uniqueness; and
   generating an output of unique data records,
   whereby data records having identifiability through non-classic identifiers are discovered.

2. The method of claim 1 wherein the step of testing combinations of elements for record uniqueness further comprises testing single elements for uniqueness.

3. The method of claim 1 further comprising setting a threshold of uniqueness and the step of testing combinations of elements further comprises identifying those records having instances between one and the threshold of uniqueness as identifiable.

4. The method of claim 1 further comprising setting a testing threshold and wherein the step of testing includes testing combinations of elements up to the testing threshold for uniqueness.

5. A computerized method for assessing identifiability in a set of data records, the data records including a plurality of elements wherein at least one element is a classic identifier, the method comprising:
   identifying and removing redundant data records in the set;
   forming a first subset of elements that are classic identifiers;
   forming a second subset of elements that are not classic identifiers; and
   in the second subset, the second subset having n elements, for k=1 to n, testing combinations of k elements for uniqueness;
   whereby non-classic identifiers associated with the data records are discovered.

6. The computerized method of claim 5 further comprising setting a threshold of uniqueness, and the step of testing combinations further comprises passing combinations having instances in the second subset from one to the threshold of uniqueness as unique.

7. The computerized method of claim 5 further comprising setting a testing threshold and wherein the step of testing includes testing combinations of elements up to the testing threshold for uniqueness.

8. A system for analyzing a set of data records for uniqueness, wherein each of the data records includes a plurality of elements wherein at least one element is a classic identifier, the system comprising:
   means for identifying and removing redundant data records in the set;
   means for forming a first subset of elements that are classic identifiers;
   means for forming a second subset of elements that are not classic identifiers; and
   means for testing combinations in the second subset, wherein the second subset has n elements, for k=1 to n, testing combinations of k elements for uniqueness;
   whereby non-classic identifiers associated with the data records are discovered.

9. The system of claim 8 further comprising means for setting a threshold of uniqueness.

10. The system of claim 8 wherein the means for testing includes a testing threshold where combinations of elements up to the testing threshold are tested for uniqueness.

11. A method for assessing identifiability in a set of data records, the data records including a plurality of elements wherein at least one element is a classic identifier, the method comprising:
    forming from the set of data records a first subset of elements that are classic identifiers;
    forming a second subset of elements that are not classic identifiers;
    identifying, using the first subset of elements, redundant records and removing the redundant records from the set of data records;
    in the second subset, testing combinations of elements for record uniqueness; and
    generating an output of unique data records,
    whereby data records having identifiability through non-classic identifiers are discovered.

12. The method of claim 11 wherein the step of testing combinations of elements for record uniqueness further comprises testing single elements for uniqueness.

13. The method of claim 12 further comprising the step of setting a threshold of uniqueness and the step of testing combinations of elements further comprises identifying those records having instances between one and the threshold of uniqueness as identifiable.

14. The method of claim 13 further comprising the step of setting a testing threshold and wherein the step of testing includes testing combinations of elements up to the testing threshold for uniqueness.

* * * * *